July 14, 1931.                S. W. ORR                1,814,330
                                VALVE
                          Filed Oct. 4, 1929

Inventor
Samuel W. Orr,
Atty.

Patented July 14, 1931

1,814,330

UNITED STATES PATENT OFFICE

SAMUEL W. ORR, OF PEORIA, ILLINOIS

VALVE

Application filed October 4, 1929. Serial No. 397,184.

My invention relates more particularly to valves constructed and arranged as faucets, though it is not confined to this use, but capable of advantageous use in a variety of other constructions and arrangements as will be apparent to those skilled in the art to which my invention appertains.

One object of my invention is to provide the valve with a renewable disc for closure, and at the same time provide means whereby the passageway through the valve may be closed at such times as it is desired to remove or renew the disc or closure.

Another object of my invention is the provision, in combination with the object mentioned above, of a closure which is free to rotate independently of the operating mechanism to the end that as the disc comes in contact with its seat its rotation will cease thereby eliminating the wear between the disc and seat which would otherwise occur.

Other objects of my invention will appear and be described in the specification.

The novelty of my invention will be hereinafter more fully set forth and specifically pointed out in the claims.

In the accompanying drawings.

The same numerals of reference are used to indicate identical parts in all the figures.

The ordinary faucet such as used in dwellings and in connection with wash basins and bath tubs is provided with a renewable closure either in the form of what is ordinarily called a fuller ball or otherwise and these closures are subject to more or less rapid deterioration and require frequent renewals, and it is often necessary when making these renewals to shut off the water supply in the basement before repairing the faucet.

Figure 1:
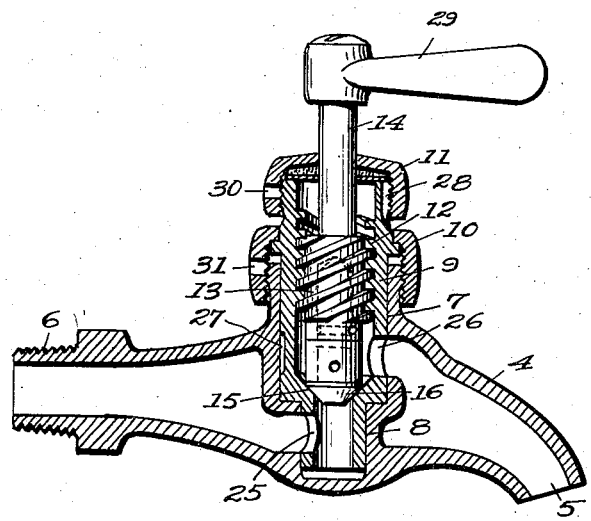
Fig. 1 is a central sectional side view of a valve embodying my invention.

With the faucet herein shown and to be now described, this extra work is eliminated and repairs may be accomplished easily without shutting off the water supply, and by referring more particularly to Fig. 1, I will now describe the construction therein shown.

The valve body is shown at 4 and is provided with the ordinary nozzle or discharge outlet 5, and the ordinary threaded inlet portion 6. The central part of the body is provided with two aligned bores 7, and 8, the outlet passage communicating with the bore 7 and the inlet passage communicating with the bore 8.

A two diameter plug 9 is fitted within the bores 7 and 8 and is held in place in the valve body by an annular nut 10 similar to the nut used in connection with a union. The upper part of the plug 9 carries a suitable stuffing box 11.

The interior of the plug 9 is threaded as at 12 to receive the operating portion 13 of the stem 14 and below the threaded portion 12, this plug is formed as a valve seat 15.

Figure 3:
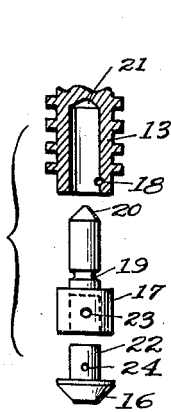
Fig. 3 is an aggregate view of the parts which form the disc or closure of the valve.

The valve disc or closure 16, shown more clearly in Fig. 3, is carried by a holder 17, and the latter projects into the lower end of the stem and is held in place by a pin passing through the opening 18 in the lower portion of the valve stem, this pin being offset and co-operating with a groove 19 in the reduced portion of the holder 17 so that, when assembled, the holder may turn freely in the lower portion of the valve stem. The upper end of the holder is formed as at 20 so that it rests within the conical portion 21 of the hole drilled in the lower portion of the valve stem, the angle of the end 20 being greater than the angle of the drill point so that the contact between the two is reduced to a small area at the center of rotation to practically eliminate both friction and wear.

The disc or closure 16 is preferably formed of a somewhat yielding material, such as rubber, and is provided with a shank 22 which fits into a suitable socket in the lower portion of the holder 17, the parts being held together by a suitable pin passing through the opening 23 in the holder and a registering opening 24 in the shank of the disc 16. In order to insure proper fitting of the parts, the opening 24 is made smaller than the opening 23 so that the pin which fits the opening 23, when forced through the opening 24 will expand the shank 22 against the side walls of the bore in the holder 17, and thus hold the disc firmly in position.

That portion of the plug 9 which is fitted within the bore 8 of the valve body is provided with an opening 25 which registers with the inlet passage of the valve body, and that portion of the plug 9 which is fitted within the bore 7, is provided with a passage 26 registering with the passage in the outlet portion 5.

If desired a circumferential channel 27 may be formed around the outside of the plug 9 in line with the opening 26.

The upper portion of the plug 9 is slotted as at 28 to receive a spanner for rotating the plug.

The operation is as follows. When it is desired to merely open the valve to permit a flow of fluid, the stem 14 is rotated as by any suitable handle 29 which, through the engagement of the threads, raises the disc 16 from its seat, and opens communication from the inlet to the outlet passages.

A reversal of the movement closes the valve.

When it is desired to remove the disc, either to replace it or otherwise, the stuffing box 11 is removed by any suitable spanner which engages the opening 30 after which the nut 10 is loosened by the same or similar spanner engaging the opening 31, whereupon the plug 9 may be partially rotated by means of a spanner engaging the slot 28 and this rotation moves the opening 25 in the lower portion of the plug 9 around and cuts off the passage to the interior of the plug 9, the lower reduced portion of the plug acting somewhat after the fashion of the ordinary plug valve. While the opening 26 also moves out of registration with the outlet passage, the circumferential channel 27, if provided, communicates with the outlet passage so that if the lower portion of the plug should not be perfectly tight within its bore, any slight leakage that might occur when the disc is removed will pass out through the outlet passage. In those cases where the outlet of the valve is connected by piping and there would be a back flow, the circumferential channel 27 is omitted and the plug 9, when rotated, closes both the inlet and outlet passages of the valve.

After having closed the inlet passage as just described, the stem 14 and the parts which it carries may be removed by merely unscrewing its threaded portion from the threads within the plug whereupon the insertion of a new disc or an inspection and repair of the old one, if required, may be accomplished and the parts replaced within the plug, screwed down to closed position, whereupon the plug may again be rotated to bring the openings 25 and 26 into proper registration, the nut 10 tightened to force the shoulder of the enlarged portion of the plug into contact with the shoulder formed by the two bores in the valve body, thus making a tight joint at this point and the stuffing box 11 replaced, thus restoring the valve to its operating condition without either dis-mounting the valve or requiring the shutting off of the supply of fluid.

Figure 2:
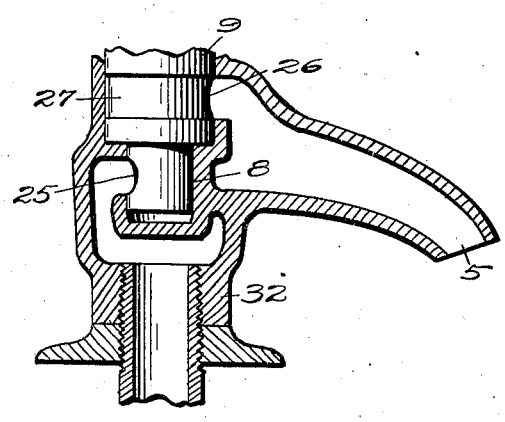
Fig. 2 is a somewhat similar fragmentary view of a valve constructed to be mounted upon the upper end of a vertical pipe.

Referring now to Fig. 2, the inlet portion 32 is arranged immediately below the axis of the plug 9, though its passage communicates with the opening 25 of the plug as in the construction shown in Fig. 1. This type of valve body is particularly adapted for use on basins where the supply pipes are vertically arranged and pass up through the horizontal surface surrounding the bowl of the basin.

The construction and arrangement of the other parts of the valve shown in Fig. 2 are the same as those shown in Fig. 1.

While I have shown a particular construction and arrangement, I do not limit myself to the details of construction or arrangement of parts shown as it is obvious that a number of changes may be made without departing from the spirit of the invention as defined in the following claims.

Having thus fully described my invention, I claim:

1. In a valve the combination of a body portion, inlet and outlet passages in the body portion, a plug receiving portion and comprising a portion in communication with the inlet passage and a portion of larger diameter in communication with the outlet passage and a seat portion at the junction of the other two portions, a plug having an enlarged cylindrical upper portion, a reduced cylindrical lower portion and a seat formed at the junction of the two portions and being provided with passages to register with the inlet and outlet passages of the body portion and having a valve seat formed between the passages of the plug, a valve closure co-operating with the valve seat of the plug, and means for holding the plug portion in adjusted position in the valve body and for forcing it into contact with the seat between the two diameters of the plug receiving portion.

2. In a valve the combination of a body portion, an inlet and outlet passage in the body portion and communicating with a plug receiving portion, a plug receiving portion having a cylindrical portion in communication with the outlet passage, a reduced diameter cylindrical portion in communication with the inlet portion, and a flat seat formed at the junction of the two cylindrical portions, a two diameter cylindrical plug fitting within the plug receiving portion and having a flat portion at the junction of the two diameters and co-operating with the seat of the body portion the plug portion being provided with inlet and outlet passages adapted to register with the passages of the body portion and being provided with a seat between the inlet and outlet passages, a removable closure co-operating with the seat in the plug portion, and means for holding the plug portion in the body portion and for pressing the plug portion against the seat formed at the junction of the two diameters thereof.

SAMUEL W. ORR.